United States Patent [19]

Molvar

[11] 4,210,534

[45] Jul. 1, 1980

[54] MULTIPLE STAGE JET NOZZLE AND AERATION SYSTEM

[75] Inventor: Allen E. Molvar, Barrington, R.I.

[73] Assignee: Clevepak Corporation, White Plains, N.Y.

[21] Appl. No.: 38,225

[22] Filed: May 11, 1979

[51] Int. Cl.² .......................... C02C 1/02; B01F 3/04
[52] U.S. Cl. .................... 210/220; 210/242 A; 261/76; 261/DIG. 75; 239/424; 366/173
[58] Field of Search .................. 261/76, DIG. 75; 239/416.5, 417.3, 424, 434.5; 366/167, 174, 11, 173; 210/14, 15, 60, 63 R, 194, 170, 220, 221 R, 242 A

[56] References Cited

U.S. PATENT DOCUMENTS

| | | | |
|---|---|---|---|
| 3,430,823 | 3/1969 | Hunsaker | 239/428.5 |
| 3,671,022 | 6/1972 | Laird | 210/220 |
| 4,019,983 | 4/1977 | Mandt | 261/DIG. 75 |
| 4,112,025 | 9/1978 | Wilson | 261/76 |
| 4,152,259 | 5/1979 | Molvar | 261/DIG. 75 |
| 4,157,304 | 6/1979 | Molvar | 210/242 A |

*Primary Examiner*—Ernest G. Therkorn
*Attorney, Agent, or Firm*—Cushman, Darby & Cushman

[57] ABSTRACT

An improved system for mixing gas with waste water in which the water is pumped through a plurality of nozzles or vortex mixing chambers into which the gas is injected at a step region to form parallel streams of gas and water. The multiple stage nozzle includes an extending chamber which contains the parallel streams as the interface between them becomes unstable, breaks down creating vortices and produces tiny bubbles which mix with the water. The extending chamber is divided into three sections or stages with at least one section tapered inwardly at a rate of 11°–22° to permit operation at higher air flow rates without loss of efficiency and the outermost section from which the mixed stream is directly discharged into the body of waste water being non-diverging, preferably cylindrical.

11 Claims, 4 Drawing Figures

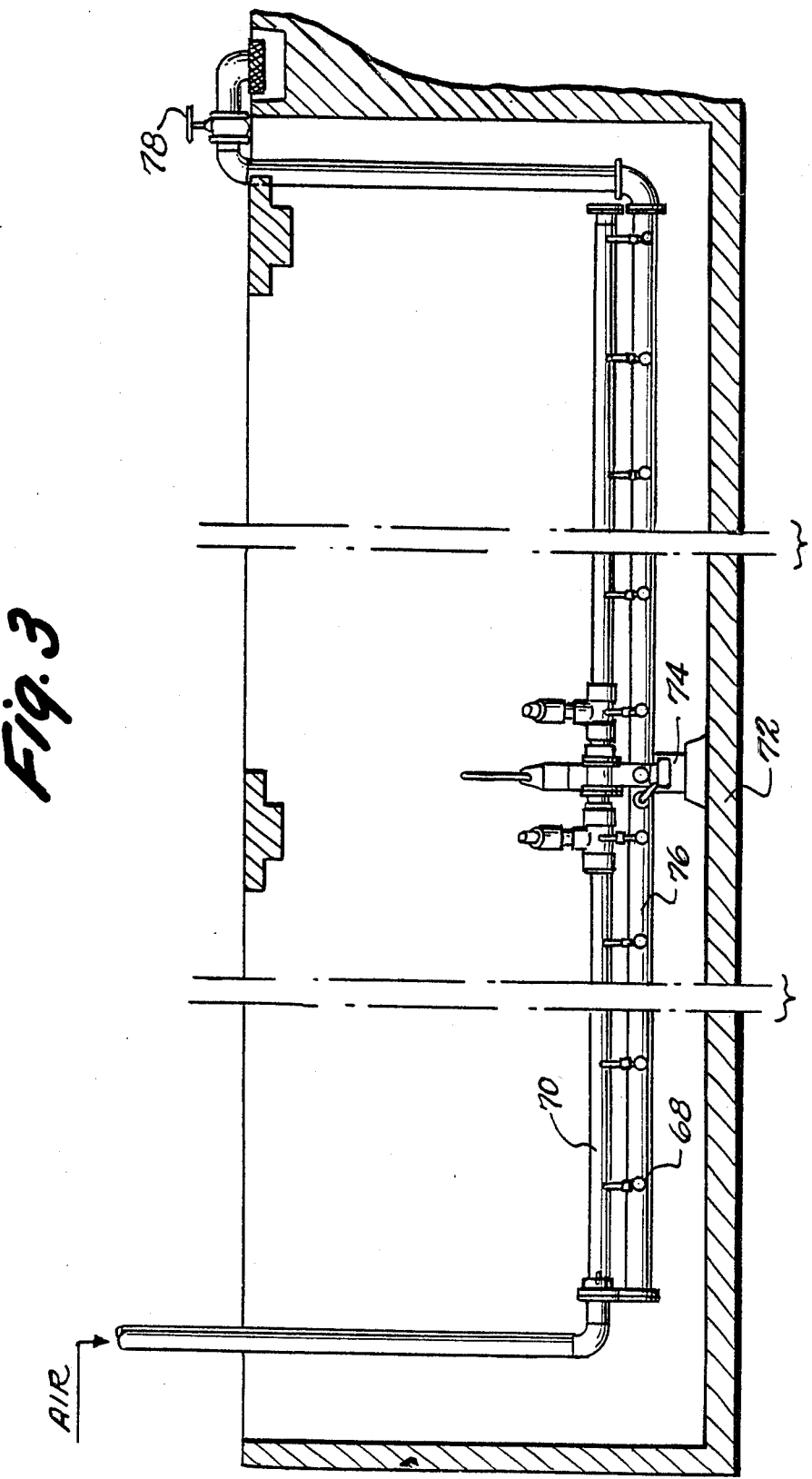

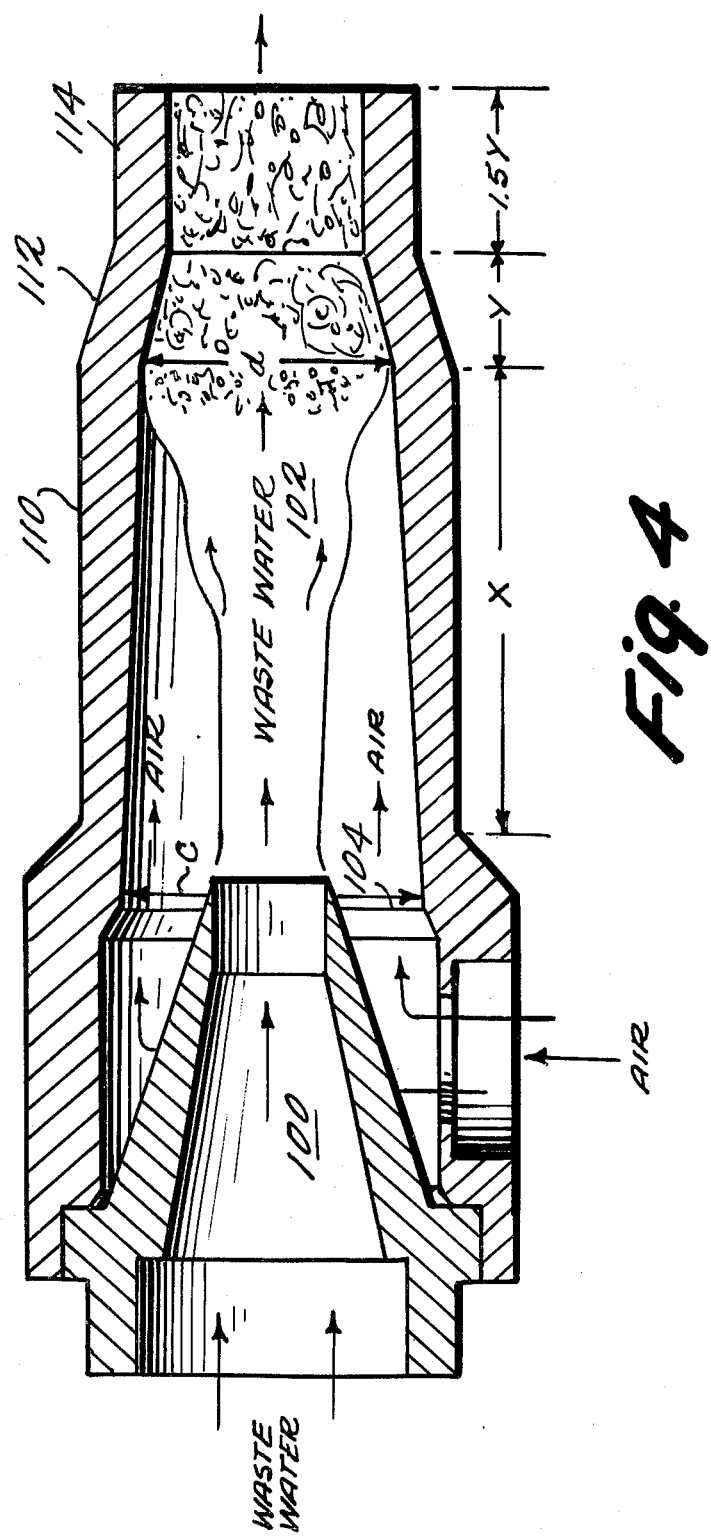

MULTIPLE STAGE JET NOZZLE AND AERATION SYSTEM

INVENTION BACKGROUND

The invention relates to an improved jet nozzle and submerged aeration system for efficiently mixing gas with waste water.

Industrial waste, domestic sewage and the like are commonly purified by pumping the liquid into a large pond, tank or basin where a bacteria population consumes the organic material. Because the dissolved oxygen in the waste water is usually insufficient to support the required population of bacteria, the water must be aerated. This can be done with mechanical surface aerators which have agitators extending into the waste water from above the water surface to agitate the water and incorporate air. Alternatively, air can be diffused through the bottom of the basin, for example, through a porous medium. Surface aerators are not efficient and cause certain mechanical problems. The energy loss of diffusing air is also great and a conventional diffused system is not suitable for installation in an existing pond, because the pond would have to be drained and taken out of service for an extended period.

The waste water can also be aerated by pumping the waste water (mixed liquor) through submerged tubes with openings through which air or other gas is drawn or pumped into the tubes to create turbulent mixing and mass transfer. This type of system is termed jet aeration and is generally more energy efficient than diffusion or surface aeration. The patent to Powers U.S. Pat. No. 2,479,403 describes an early jet aeration system.

The present invention relates to an improved system for mixing a gas such as oxygen or air with waste water in a body of waste water. In a prior art system, a plurality of vortex mixing chambers or jet nozzles is located below the surface of the waste water and water in the body is pumped through each nozzle from an inlet to an outlet. A suitable gas, such as oxygen or air containing oxygen, is injected into each of the vortex mixing chambers at a step region to form parallel streams of air and water in an extending chamber. As the two streams move down the extending chamber, the interface between the two streams becomes unstable and water waves form which trap gas. As the waves grow in amplitude they eventually attach to the sides of the extending chamber. This causes large frictional stresses and creates tiny bubbles which mix with the water. The small bubble-water mixture is then discharged below the surface of the waste water body. The small bubble mixture has a large surface area which transfers oxygen to the waste water.

Since the water and air essentially flow in the same direction, horizontal momentum is exchanged between the gas and water. Inasmuch as there is very little friction between the parallel air and water streams at their interface, virtually no energy is wasted in unnecessary turbulence. At the point of water wave attachment to the extending chamber, frictional and turbulent energies of the vortex formed are harnessed to disperse the gas into a distribution of extremely fine bubbles. Further, the small bubbles are dispersed throughout the water phase resulting in a fine bubble air-water mixture. The vortexing point (the point of wave attachment to the extending chamber) is a function of the gas flow rate. As the flow rate increases, the vortexing point moves downstream. Systems of this type are described and claimed in copending application Ser. No. 598,871, filed July 24, 1975.

In an improved prior art device, the extending chamber is inwardly tapered in the downstream direction to ensure that the vortices created do not extend out of the chamber at high air flow rates which would reduce the efficiency of mixing and mass transfer. Thus, the device operates at a high and constant efficiency over a wide range of air flow rates. Further, helical vanes can be provided in the injection passages for the gas to create greater wave generating conditions which extend the operating range of the device to greater air flow rates. This improved taper system is described and claimed in copending application Ser. No. 863,588, filed Dec. 22, 1977, now U.S. Pat. No. 4,157,304, and co-pending application Ser. No. 953,212, filed Oct. 20, 1978.

As described in the above-mentioned U.S. Pat. No. 4,157,304, in this improved prior art device, the extending chamber is divided into a first section or stage extending from the step region and a second inwardly tapered section or stage extending downstream from the first section. This second section is shorter than the first and tapered at a rate greater than any taper of the first section. It is desired that both sections be tapered, but if only the second section is tapered, the results are satisfactory, and the cost of manufacture is less when machining techniques rather than molding techniques are used. However, when molding in plastic, tapering of the first section aids in removal from the mold. The first section is preferably non-diverging, and the length of the first section along the flow direction is preferably between one and ten times the diameter at the step region. The length of the second section along the flow direction is preferably between one-eighth and one times the diameter at the first and second intersection of the sections, and the taper of the second section is preferably between 11° and 22°.

This system can be quickly and easily installed in any existing aeration pond, lagoon, or tank without the need for the facility to be shut down for an extended period and without the need for the pond or tank to be drained—a project which is difficult or impossible to accomplish in most instances. The system can, in fact, be installed and operating within a few minutes. In comparison with diffused air type devices and surface aeration systems, the energy required to incorporate a given amount of oxygen into the water is much less. Further, the bubbles which are produced are tiny, thus creating a good environment for effective use of oxygen by the bacteria within the pond or basin. Many of the other disadvantages of surface aerators and diffusion type devices are also avoided.

SUMMARY OF THE PRESENT INVENTION

According to the present invention, the tapered nozzle of the prior art device is improved by the addition of a third range or section extending in the direction of flow from the second section and tapered less than the second section, and thus the title "multiple stage". The third section is non-diverging, is preferably a cylinder and is preferably about one to three times the second section in length, more preferably about 1.5 times the second section in length. Although addition of the third section slightly increases costs of manufacture, efficiency in terms of lbs. $O_2$/hp. hr. transferred by the system is increased, perhaps as much as 20% in comparison with a prior art system having jet nozzles with only two sections to the extending chamber.

The reasons for the substantial increase in efficiency of the multiple stage nozzle resulting from addition of the third stage are not fully understood. However, it is believed that additional vortex tripping, gas dispersion and radial mixing occur in the third stage. Larger bubbles are belived to be biased toward the regions of the extending chamber nearest the wall as mixing occurs. The third stage may cause further shearing of these larger bubbles into smaller bubbles which are then dispersed into the mixed stream. Thus even smaller bubbles may be thus being produced with little increase in energy consumption. Smaller bubbles mean greater surface area of air/water interface and thus greater efficiency of gas transfer to the liquid.

Nozzles, of course, are used for injecting and mixing wide varieties of gas and liquid streams. Many nozzle configurations in the prior art are similar to the present invention in structure, but function quite differently and mix quite different materials. The patent to Kranz U.S. Pat. No. 2,883,167 is one example of a structurally similar nozzle.

Other objects and purposes of the invention will be clear from the following detailed description of the drawings.

BRIEF DESCRIPTION OF THE DRAWINGS

FIG. 3 shows a sectional view of the system installed on the bottom of a tank of waste water; and FIG. 4 shows a sectional view of the unique multiple stage jet nozzle of the present invention.

DETAILED DESCRIPTION OF THE DRAWINGS

Figure 1:
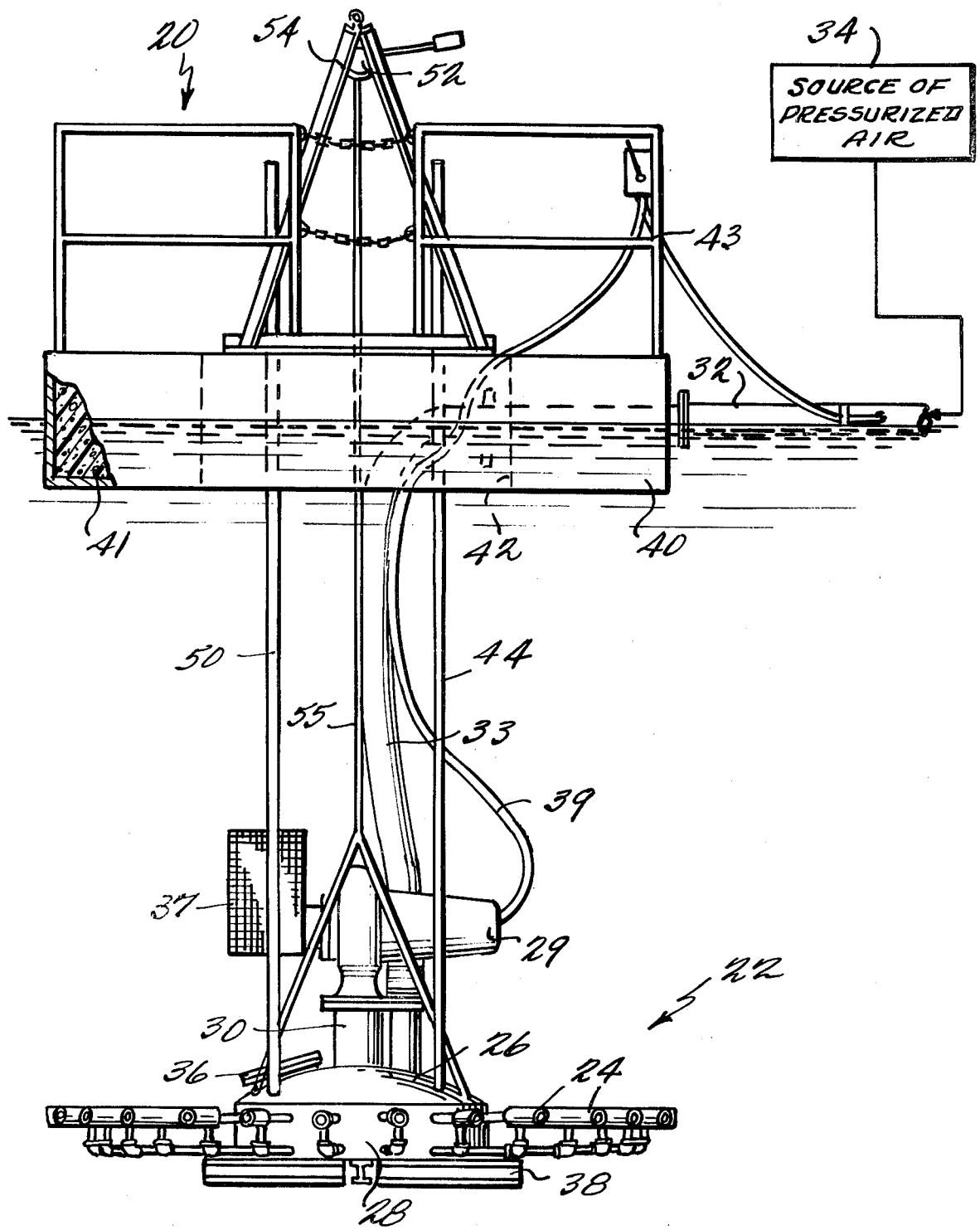
FIG. 1 shows a schematic side view of the system of the present invention installed in a body of waste water beneath a floating platform.
Figure 2:
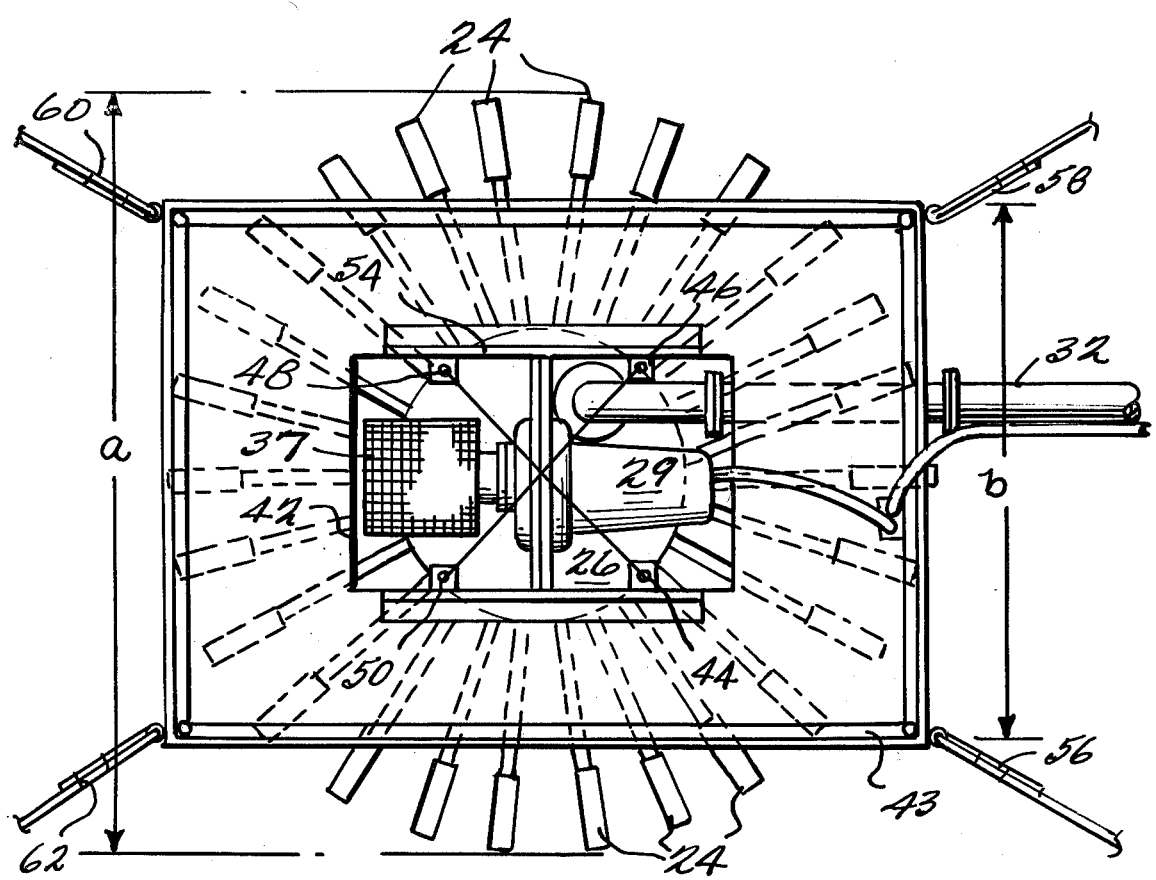
FIG. 2 shows a planar view of the system of FIG. 1.

Reference is now made to FIGS. 1 and 2 which illustrate a preferred embodiment of the invention. Aspects of this embodiment are disclosed and claimed in a copending application entitled WASTE TREATMENT APPARATUS, Dkt. 36, Ser. No. 953,215, filed Oct. 20, 1978. Floating platform 20 adjustably suspends aeration device 22 in a body of waste water. Aeration device 22 is comprised of a plurality of jet nozzle aerators 24, for example, twenty-six jet aerators radially extending outward from a water manifold 26 having a dome upper surface with an access port 36. A bottom bracket 38 allows device 22 to sit on the bottom of the body if desired.

Waste (mixed liquor) is pumped radially outward through an internal passage in each of these jet aerators. Air from a second manifold 28 disposed below manifold 26 and separated therefrom by a suitable partition or diaphragm (not shown) is injected into each of the nozzles to form parallel water and air streams. The operation of this type of jet aerator and detailed structure thereof are further described in U.S. Patent Application Ser. No. 863,588, filed Dec. 22, 1977, now U.S. Pat. No. 4,157,304, and Ser. No. 863,587, filed Dec. 22, 1977, now U.S. Pat. No. 4,152,259, both the invention of the present applicant and in Ser. No. 598,871, filed July 24, 1975, the co-invention of the present applicant and a second inventor. The disclosure of each of these applications is hereby incorporated by reference into the present application.

Recirculated waste water (mixed liquor) is supplied to the manifold by a conventional submersible pump 29 via a neck portion conduit 30. Screen 37 covers the pump inlet and filters debris in the body, and electric line 39 powers pump 29. Air is supplied to the manifold 28 via conduit 32 from a source of pressurized air shown schematically as source 34 and located above the surface of the water, for example, on land.

Platform 20 is designed and includes a number of features which make the platform a stable, desirable and effective support for suspending an aeration device. Base 40 provides the positive buoyancy required to support the aeration device 22, and is preferably closed on the top, bottom and all sides and contains conventional foam material 41, part of which can be seen in the partially broken away part of FIG. 1. Safety rails 43 extend about the top surface of base 40.

Conduit 32 extends through the interior of hollow base 40 between peripheral surface and the central opening and connects to flexible hose 33 which in turn connects to manifold 28. The conduit 32 exerts no force on the platform, and it functions like an outrigger to increase the stability of the platform.

Base 40 is provided with a rectangular central opening 42 exposing the waste water surface to the atmosphere. This opening is desirable to prevent rolling and pitching of the platform during operation and particularly during back-flush operation in which considerable flow of water and entrained air in an upward direction occurs.

Aeration unit 22 is connected to the platform by four stabilizing bars 44, 46, 48 and 50 which are welded to the dome upper surface of manifold 26 and can be readily adjusted on the platform to move the aeration unit in a vertical direction. Bars 44, 46, 48 and 50 prevent rotation, rolling and pitching. Winch 52 is suspended from an A-frame 54 made of aluminum and connected to the dome 26 by cable 55 at four separate locations which are joined above the center of gravity of the submerged unit as shown. The A-frame retrieval winch 52 allows aeration device 22 to be raised high enough for maintenance. Guy wires 56, 58, 60 and 62 attach floating platform 20 to solid supports for wind stabilization (not shown).

The present invention can also be constructed to sit on the bottom of a tank, lagoon or the like. As the alternative to a radial configuration, as shown in FIG 3, nozzles 68 can extend from linear pipes serving as manifolds. Air is supplied to pipe 70 while water in tank 72 is pumped through pipe 74, by pump 76, the pipes serving respectively as linear air and water manifolds. The nozzles 68 extend outwardly from pipe 74 at separated locations. The pipes extend in parallel in the illustrated embodiment but can alternatively extend one within the other. The system is flushed by opening valve 78 while pump 74 is turned off and air continued to be supplied to nozzles 68.

FIG. 4 illustrates one multiple stage jet nozzle or vortex mixing chamber 24 in detail. Waste water flows from the inlet through passage 100 into the extending chamber 102. At the entry of passage 100 and into chamber 102, a step region 104 is provided which includes gas passages. The passages inject gas at an analog between roughly 11° and 22½.

Thus, an annular stream of gas which surrounds a stream of waste water is created as shown in FIG. 4. As the streams move along the chamber 102, water waves begin to form and trap pockets of air, which are sheared into tiny bubbles and dispersed into the waste water. Since the gas and water streams move in the same direction, effective mixing is achieved at minimum energy consumption.

The extending chamber is divided into first stage or section 110, second stage or section 112, and third non-diverging and preferably cylindrical stage or section 114, from which the mixed stream is directly discharged into the body of waste water. Section 112 is tapered between 11° and 22°, whereas in the illustrated embodiment section 110 is tapered 1° to 2°. If desired, section 110 can be a straight cylinder. The length x of the first section is between one and ten times the distance c and the length y of the second section, between one-quarter and two times the distance d. If the length y is less than than about one-quarter, circulating eddies are created which decrease efficiency. As the length y increases greater than about two times, efficiency decreases. If the length x is less than one, then the vortices tend to blow out of the tube. If the length x is greater than ten, coalescence results and efficiency declines. The length of section 114 is preferably about one to three times the section 112 in length and more preferably substantially 1.5 y.

Many changes and modifications in the above-described embodiments can be carried out without departing from the scope of the present invention, that scope being intended to be limited only by the scope of the appended claims.

What is claimed is:

1. A system for aerating waste water in a body of waste water comprising:
    at least one mixing chamber adapted for immersion in said body for providing a waste water passage, including:
    an extending chamber,
    a liquid passage for guiding waste water flow into said extending chamber, the cross-sectional area of the liquid passage at the entry into said extending chamber being less than the cross-sectional area of said extending chamber at the entry so as to form a step region, and said extending chamber including at least three sections extending from said step region, a first section extending downstream from said step region, a second section extending downstream from said first section and tapered inwardly at a rate greater than any rate of taper of the first section to maintain mixing within said extending chamber and a third non-diverging section extending downstream from said second section, any taper of said third section being less than the taper of said first section, and said third section being at least as long as said second section and directly discharging a mixed stream into said body and,
    means defining at least one gas passage terminating at said step region for injecting gas into said extending chamber to form parallel gas and water streams, said extending chamber extending downstream from the termination of said gas passage for confining flow of the parallel gas and water streams for a distance until the interface between said streams becomes unstable in said extending chamber and vortices are tripped to produce gas bubbles which are mixed with the water stream to produce said mixed stream;
    means for pumping said waste water through said at least one mixing chamber;
    means for mounting said mixing chamber below the surface of said body of water; and
    means for supplying an aerating gas to said gas passage for injection into waste water within said mixing chamber.

2. A system as in claim 1, wherein said first and third sections have circular cross-sections at their intersection to said second section and at said step region and the length of said first section is between 1 and 10 times the diameter at said step region and the length of said second section is between one-quarter and two times the diameter at said intersection to said second section.

3. A system as in claim 1, wherein the taper of said second section is between 11° and 22° of said first section.

4. A system as in claim 1, wherein said first section is non-diverging.

5. A system as in claim 4, wherein said first section is tapered.

6. A system as in claim 1, including a plurality of said mixing chambers.

7. A system as in claim 6, wherein said pumping means includes a water manifold, the extending chambers of said plurality of mixing chambers extending outward from said water maifold and a pump mounted above said water manifold and connected to said water manifold and wherein said gas supplying means includes a conduit adapted for connection to a source of gas and a gas manifold connected to said conduit.

8. A system as in claim 1, wherein the length of said third section is substantially one to three times the length of said second section.

9. A system as in claim 8, wherein the length of said third section is substantially 1.5 times the length of said second section.

10. A system as in claims 1 or 8, wherein said third section is cylindrical.

11. A system as in claim 1 wherein said second section is shorter than said first section along the direction of water flow.

* * * * *